United States Patent
Ye et al.

(10) Patent No.: US 10,411,995 B2
(45) Date of Patent: Sep. 10, 2019

(54) NETWORK SYSTEM CONTROL METHOD AND NETWORK SYSTEM RELATED TO AGGREGATION OPERATION USING REDUNDANT FLOW ENTRY

(71) Applicants: Inventec (Pudong) Technology Corp., Shanghai (CN); Inventec Corporation, Taipei (TW)

(72) Inventors: Yu-Ching Ye, Taipei (TW); Tzu-Yu Chao, Taipei (TW); Kuo-Chen Wang, Taipei (TW)

(73) Assignees: Inventec (Pudong) Technology Corp., Shanghai (CN); Inventec Corporation, Taipei (TW)

( * ) Notice: Subject to any disclaimer, the term of this patent is extended or adjusted under 35 U.S.C. 154(b) by 0 days.

(21) Appl. No.: 15/787,686

(22) Filed: Oct. 18, 2017

(65) Prior Publication Data

US 2018/0131603 A1 May 10, 2018

(30) Foreign Application Priority Data

Nov. 10, 2016 (CN) .......................... 2016 1 0994137

(51) Int. Cl.
| | |
|---|---|
| *H04L 12/715* | (2013.01) |
| *H04L 12/721* | (2013.01) |
| *H04L 12/743* | (2013.01) |
| *H04L 12/755* | (2013.01) |
| *H04L 12/851* | (2013.01) |

(52) U.S. Cl.
CPC ............ *H04L 45/38* (2013.01); *H04L 45/021* (2013.01); *H04L 45/64* (2013.01); *H04L 45/7457* (2013.01); *H04L 47/2483* (2013.01); *H04L 45/04* (2013.01)

(58) Field of Classification Search
CPC ..... H04L 45/38; H04L 45/64; H04L 45/7457; H04L 45/021; H04L 47/2483; H04L 45/04
See application file for complete search history.

(56) References Cited

U.S. PATENT DOCUMENTS

| | | | | |
|---|---|---|---|---|
| 10,033,619 | B2 * | 7/2018 | Li ............................ | H04L 43/16 |
| 2011/0307628 | A1 * | 12/2011 | Chiba .................. | H04L 49/355 |
| | | | | 709/241 |
| 2015/0009827 | A1 * | 1/2015 | Kawai ..................... | H04L 45/64 |
| | | | | 370/235 |
| 2016/0149806 | A1 * | 5/2016 | Park ...................... | H04L 45/586 |
| | | | | 370/254 |

* cited by examiner

*Primary Examiner* — Ian N Moore
*Assistant Examiner* — Rushil Parimal Sampat
(74) *Attorney, Agent, or Firm* — Winston Hsu (57) ABSTRACT

A network system control method includes intercepting a flow modification message sent by a controller from a network protocol path between a switch and the controller so as to obtain a new flow entry; accessing a flow table of the switch so as to obtain a plurality of flow entries; inserting at least one redundant flow entry according to the new flow entry and the plurality of flow entries; performing an aggregation operation to the new flow entry, the plurality of flow entries and the at least one redundant flow entry so as to generate a set of aggregated flow entries; and updating the flow table using the set of aggregated flow entries.

8 Claims, 8 Drawing Sheets

NETWORK SYSTEM CONTROL METHOD AND NETWORK SYSTEM RELATED TO AGGREGATION OPERATION USING REDUNDANT FLOW ENTRY

BACKGROUND OF THE INVENTION

1. Field of the Invention

The present invention relates to a network system control method, and more particularly, a network system control method including performing an aggregation operation using at least one redundant flow entry to generate a set of aggregated flow entries and update a flow table accordingly.

2. Description of the Prior Art

Soft-defined networking (SDN) may separate a control interface of a router from a data interface in order to simplify response rules of network events and the management of behavior pattern. SDN may make it easier to update hardware and communications protocols. Therefore, SDN is often regarded as a better network structure solution of the next generation.

SDN may use interface technology such as OpenFlow currently. A flow table may be set in a switch. The flow table may include a plurality of flow entries. The flow entries may be compared with packets received by the switch so as to determine the transmission of the packets.

A controller may send new flow entries to be written in the flow table. However, when the flow table is full, the writing may fail. This is a problem of overflow of the flow table. For example, when using a ternary content addressable memory (TCAM), the capacity of the flow entry may be limited by the size of the memory, and the flow table may fail to be updated with the new flow entries. Hence, a solution is in need to reduce the overflow problem of the flow table.

SUMMARY OF THE INVENTION

An embodiment of the present invention may provide a network system control method. The method may include intercepting a flow modification message sent by a controller from a network protocol path between a switch and the controller so as to obtain a new flow entry; accessing a flow table of the switch so as to obtain a plurality of flow entries; inserting at least one redundant flow entry according to the new flow entry and the plurality of flow entries; performing an aggregation operation to the new flow entry, the plurality of flow entries and the at least one redundant flow entry so as to generate a set of aggregated flow entries; and updating the flow table using the set of aggregated flow entries.

Another embodiment of the present invention may provide a network system including a controller and a switch. The controller may be used to send a flow modification message and a packet. The switch may include a security channel module and a routing unit. The security channel module may be linked to the controller via a network protocol path and used to receive the flow modification message. The routing unit may include a flow table. The flow table may have a plurality of flow entries. The plurality of flow entries may be used to be compared with the packet so as to confirm a destination address and a corresponding operation of the packet. The switch may be used to obtain a new flow entry according to the flow modification message, insert at least one redundant flow entry according to the new flow entry and the plurality of flow entries, perform an aggregation operation to the new flow entry, the plurality of flow entries and the at least one redundant flow entry so as to generate a set of aggregated flow entries, and update the flow table using the set of aggregated flow entries.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
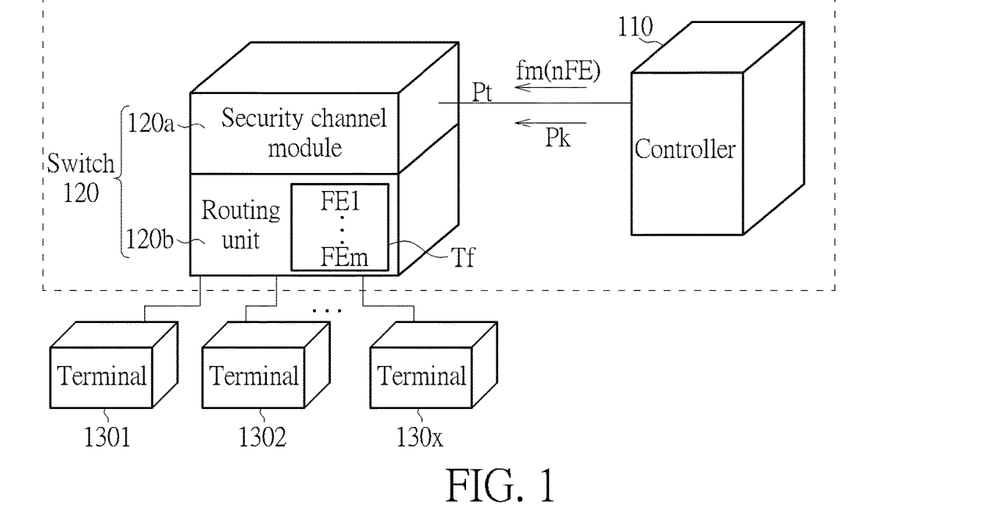
FIG. 1 illustrates an SDN network system according to an embodiment of the present invention.

FIG. 1 illustrates an SDN network system 100 according to an embodiment of the present invention. The network system 100 may include a controller 110 and a switch 120. The switch 120 may include a security channel module 120a and a routing unit 120b. The security channel module 120a may be linked to the controller 110 via a network protocol path Pt. The controller 110 may be further linked to terminals 1301-130x. Each of the terminals 1301-130x may be a transceiving terminal such as a personal computer. The network protocol path Pt may be a path being compliant with Transport Layer Security (TLC) protocol or Secure Sockets Layer (SSL) protocol. The network protocol path Pt may also be compliant with OpenFlow protocol. The controller 110 may be used to send a flow modification message fm (such as the request message flow_mod mentioned in the OpenFlow document) and a packet Pk to the switch 120. The routing unit 120b may include a flow table Tf. The flow table Tf may include a plurality of flow entries. The flow table Tf may be compared with the packet Pk so as to confirm a destination address and a corresponding operation of the packet Pk, for instance, to confirm if the packet Pk is correctly sent to one of the terminals 1301-130x. Hence, the flow entries of the flow table Tf may act as flow rules. The network system 100 may have a system structure formed by integrating hardware devices and control software. The network system 100 may have a system structure formed by integrating hardware devices and control software.

Figure 2:
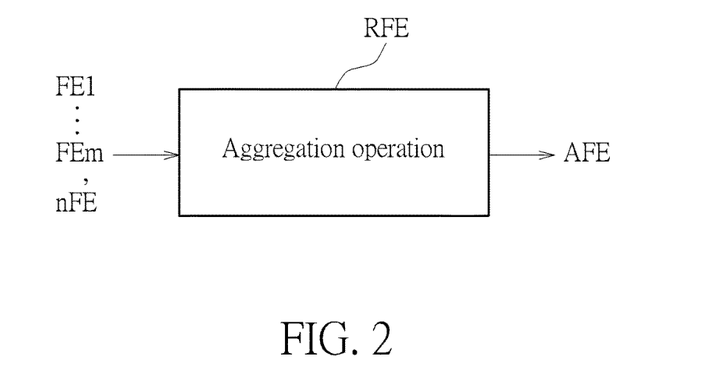
FIG. 2 illustrates a block diagram of the network control method according to an embodiment of the present invention.
Figure 3:
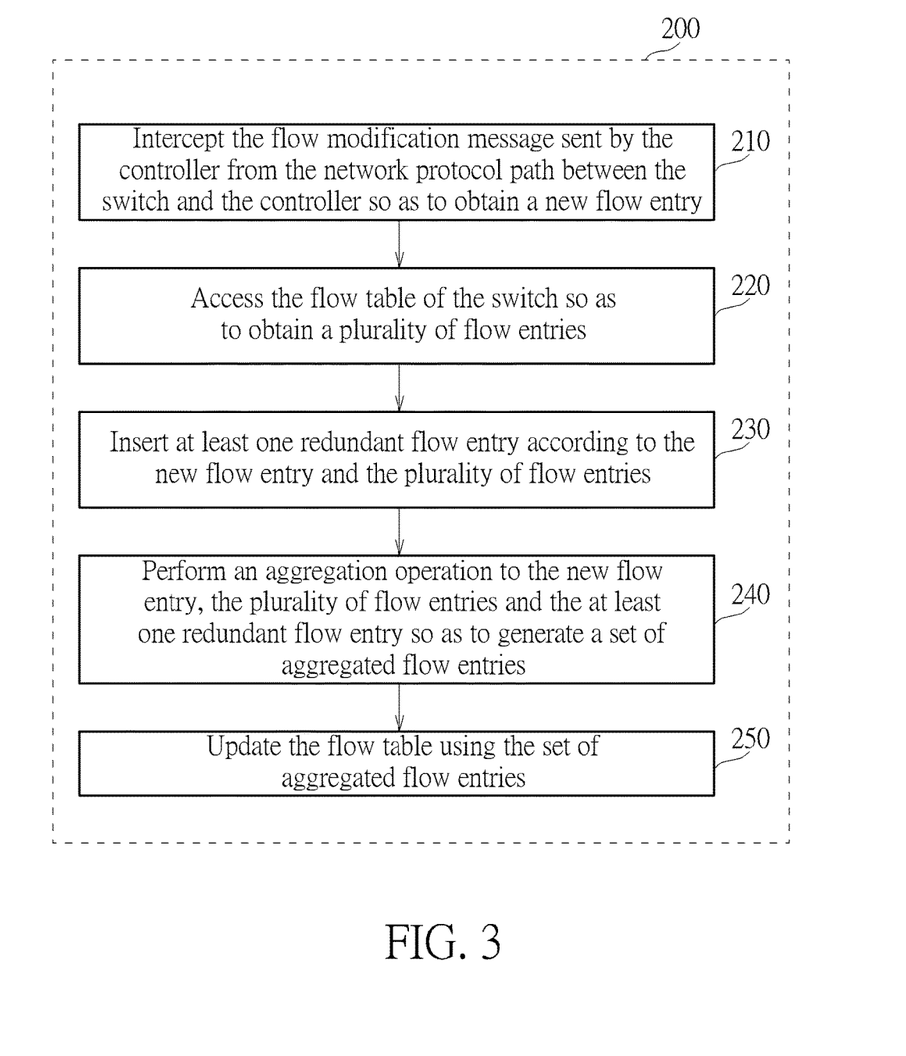
FIG. 3 illustrates a flow chart of a network control method according to an embodiment of the present invention.

FIG. 2 illustrates a block diagram of the network control method according to an embodiment of the present invention. A method provided by the present invention may be the in-switch dynamic flow aggregation (IDFA) method. FIG. 3 illustrates a flow chart of a network control method 200 according to an embodiment of the present invention. FIG. 3 may be referred to with FIGS. 1-2. The network control method 200 may include the following steps.

Step 210: intercept the flow modification message fm sent by the controller 110 from the network protocol path Pt between the switch 120 and the controller 110 so as to obtain a new flow entry nFE;

Step 220: access the flow table Tf of the switch 120 so as to obtain a plurality of flow entries FE1-FEm;

Step 230: insert at least one redundant flow entry RFE according to the new flow entry nFE and the plurality of flow entries FE1-FEm;

Step 240: perform an aggregation operation to the new flow entry nFE, the plurality of flow entries FE1-FEm and the at least one redundant flow entry RFE so as to generate a set of aggregated flow entries AFE; and Step 250: update the flow table Tf using the set of aggregated flow entries AFE.

In Step 220-230, the new flow entry nFE and the flow entries FE1-FEm may be arranged and sorted so that the at least one redundant flow entry RFE may be inserted accordingly as described below.

Figure 4:
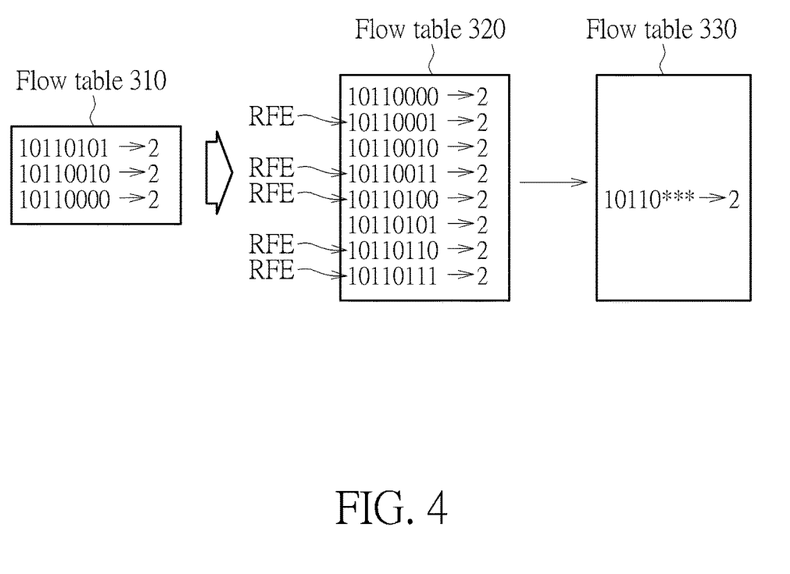
FIG. 4 illustrates an example of inserting a redundant flow entry to perform an aggregation operation according to an embodiment of the present invention.

FIG. 4 illustrates an example of inserting a redundant flow entry to perform an aggregation operation according to an embodiment. Taking OpenFlow protocol as an example, each flow entry may include data related to a match field, priority, a counter, an instruction, timeout, a cookie, a flag, and so forth. The data of match field may include an Ethernet type, a protocol type, an internet protocol (IP) address, a destination IP address and an action. Hence, the number of bits in a flow entry may be larger. In order to simplify the flow, it is allowed to merely check the destination IP address according to an embodiment of the present invention. The address described here may be represented using dot-decimal notation. For example, an IP address 140.113.6.2 may be represented as an address having four sets of 8-digit numbers such as 10001100.01110001.00000110.00000010. According to an embodiment, when the first three numbers of a group of IP addresses are identical, the last numbers of the addresses may be used to perform the aggregation operation. In the table 310 in FIG. 4, three known flow entries are expressed as "10110101→2", "10110010→2" and "10110000→2" with some fields being omitted. The 8-digit numbers of each flow entry in the table 310 may be the last number of the destination IP address, and the number after the arrow sign may represent the action section of the flow entry. The action section may correspond to a port number of a switch. For example, the expression "→2" may describe that a packet is sent to the destination IP address via a $2^{nd}$ port. When a group of destination IP addresses are identical, the port of a switch used to send packets may be the same one. Hence, using destination IP addresses to perform an aggregation operation may assure consistence of action sections. This operation may be suitable for IPv4 network and application of a routing algorithm of using a shortest path. Hence, according to embodiment, Step 230 may include inserting the at least one redundant flow entry RFE according to a destination address (e.g. a destination address recorded with the constant dst_ip of the OpenFlow document) of the new flow entry nFE and the destination addresses of the flow entries FE1-FEm.

As shown in the table 320, the three flow entries (i.e. "10110101→2", "10110010→2" and "10110000→2") may be arranged as the first, the third and the sixth items from the top. By checking the items using the binary notation, it is seen that the first five digits (i.e. 11010) are identical, and there should be eight combinations 000 to 111 for the last three digits. Since three of the eight combinations are in the table 310, the other five combinations may be filled in the table 320. Hence, five numbers 10110001, 10110011, 10110100, 10110110 and 10110111 may be arranged as the second, fourth, fifth, seventh and eighth items of the table 320 to make up the eight combinations. At the beginning of filling the five numbers, action sections of the five numbers may be unknown, and then the action sections may be confirmed as "→2" shown in the table 320 after validation. The way of validation may include that the switch 120 sends a packet input message (e.g. the packet_in message of OpenFlow protocol) to the controller 110 so as to confirm correctness of action section of the at least one redundant flow entry RFE. The five numbers and the five action sections filled in the table 320 may be seen as five flow entries and treated as the redundant flow entries mentioned in Step 230. The table 330 may include a result of an aggregation operation performed by using the eight flow entries in the table 320. The said aggregation operation may be a simplification operation. Since the first five digits of the eight flow entries in the table 320 are identical, the eight flow entries may be expressed as 10110* after being aggregated, and the action section may be added to obtain the aggregated flow entry "10110*→2". The three flow entries in the table 310 may be aggregated to be the one flow entry shown in the table 330, hence the number of flow entries may be reduced by means of aggregation operation. FIG. 4 merely illustrates an example rather than limiting the scope of the present invention.

Figure 5:
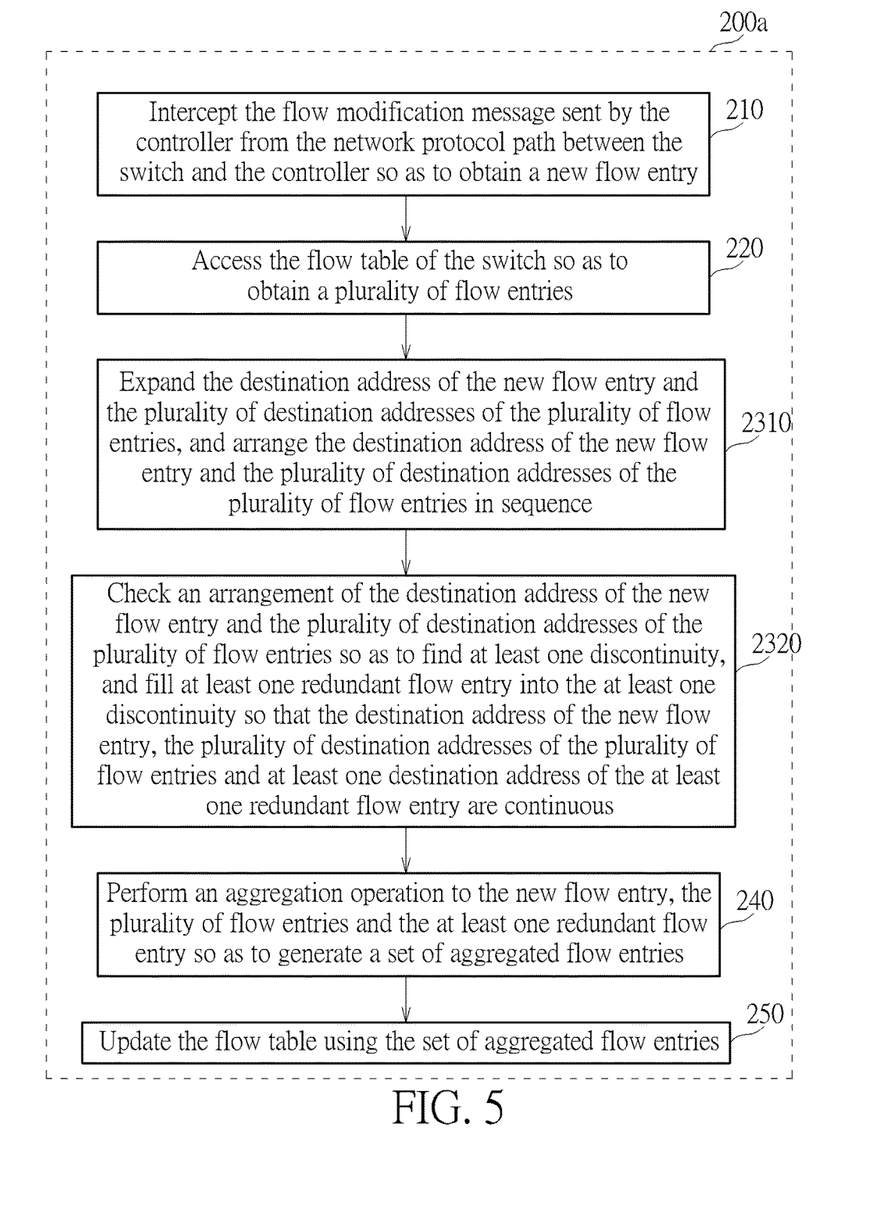
FIG. 5 illustrates a network system control method according to an embodiment of the present invention.

FIG. 5 illustrates a network system control method 200a according to an embodiment. The method 200a may be based on the method 200 of FIG. 3. As described, at least one redundant flow entry may be inserted according to destination addresses of a set of flow entries so as to perform a following aggregation operation. Hence, Step 230 may include Steps 2310-2320, the method 200a may include following steps.

Step 210: intercept the flow modification message fm sent by the controller 110 from the network protocol path Pt between the switch 120 and the controller 110 so as to obtain a new flow entry nFE;

Step 220: access the flow table Tf of the switch 120 so as to obtain a plurality of flow entries FE1-FEm;

Step 2310: expand the destination address of the new flow entry nFE and the plurality of destination addresses of the plurality of flow entries FE1-FEm, and arrange the destination address of the new flow entry nFE and the plurality of destination addresses of the plurality of flow entries FE1-FEm in sequence;

Step 2320: check an arrangement of the destination address of the new flow entry nFE and the plurality of destination addresses of the plurality of flow entries FE1-FEm so as to find at least one discontinuity, and fill at least one redundant flow entry RFE into the at least one discontinuity so that the destination address of the new flow entry nFE, the plurality of destination addresses of the plurality of flow entries FE1-FEm and at least one destination address of the at least one redundant flow entry RFE are continuous;

Step 240: perform an aggregation operation to the new flow entry nFE, the plurality of flow entries FE1-FEm and the at least one redundant flow entry RFE so as to generate a set of aggregated flow entries AFE; and Step 250: update the flow table Tf using the set of aggregated flow entries AFE.

Steps 2310-2320 may describe a way to insert at least one redundant flow entry according to embodiment. Furthermore, in Step 240 of FIG. 3, a set of wildcard signs (e.g. asterisks) may be used to replace a non-corresponding portion of the destination address of the new flow entry nFE, the plurality of destination addresses of the plurality of flow entries FE1-FEm and the at least one destination address of the at least one redundant flow entry RFE so as to generate the set of aggregated flow entries AFE, and a corresponding portion may be kept. For example, in the table 330 of FIG. 4, the aggregated flow entry (10110*→2) is expressed with wild card signs. According to embodiments, an aggregated flow entry generated by an aggregation operation may be expressed in the Classless Inter-Domain Routing (CIDR hereinafter) format. For example, if a destination IP address of an aggregated flow entry is 140.113.1.000110 (that is 10001100.1110001.00000001.000110 in IPv4 format), the last set of digits "000110" may be expressed as "24/30". The "24" before the slash may refer to the two "1s" at the fourth and fifth digits. The "30" after the slash may be used to perform a calculation "32−30=2" so as to correspond to the two wild card signs "" at the last two digits. The two wild card signs "" may include four combinations 00, 01, 10 and 11.

Figure 6:
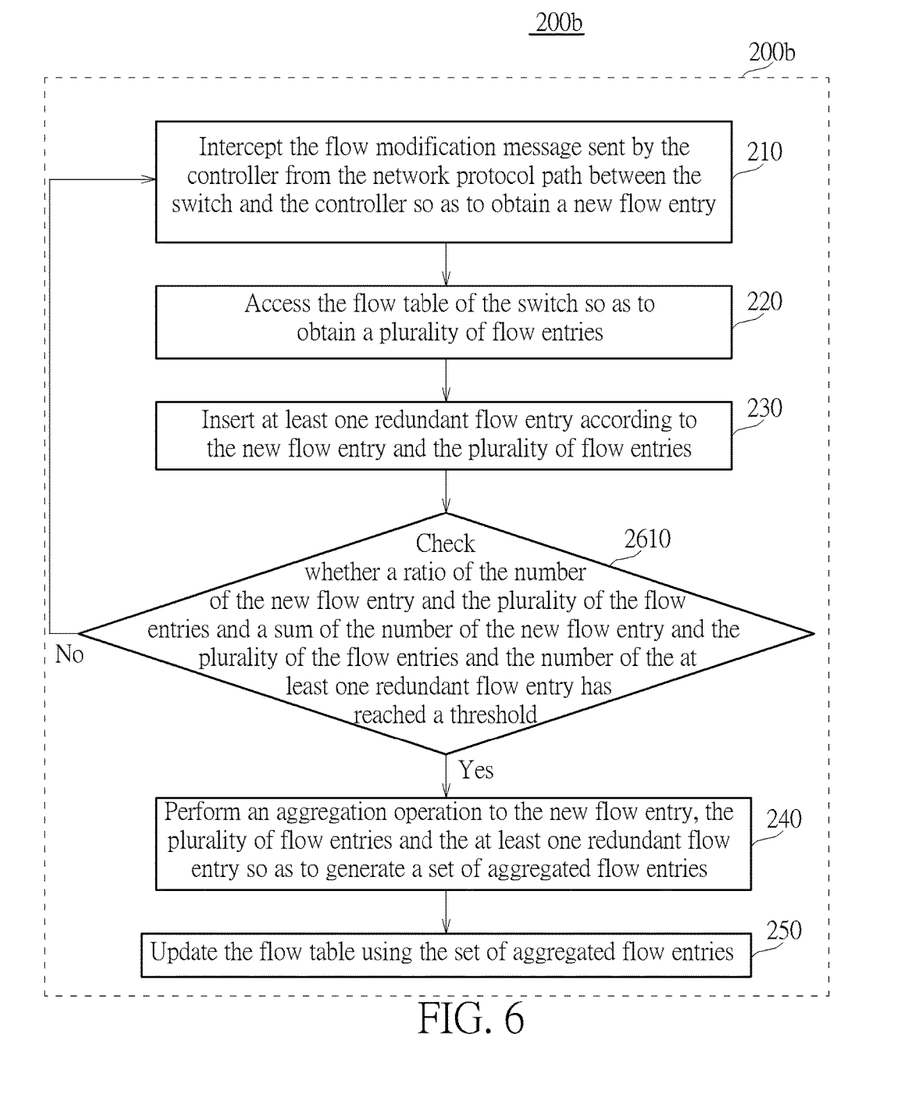
FIG. 6 illustrates a network system control method according to an embodiment of the present invention.

FIG. 6 illustrates a network system control method 200b according to an embodiment. The method 200b may be based on the method 200. However, Step 2610 may be performed selectively between Steps 230 and 240. The method 200b may include the following steps.

Step 210: intercept the flow modification message fm sent by the controller 110 from the network protocol path Pt between the switch 120 and the controller 110 so as to obtain a new flow entry nFE;

Step 220: access the flow table Tf of the switch 120 so as to obtain a plurality of flow entries FE1-FEm;

Step 230: insert at least one redundant flow entry RFE according to the new flow entry nFE and the plurality of flow entries FE1-FEm;

Step 2610: check whether a ratio of the number of the new flow entry nFE and the plurality of the flow entries FE and a sum of the number of the new flow entry nFE and the plurality of the flow entries FE1-FEm and the number of the at least one redundant flow entry RFE has reached a threshold; if so, enter Step 240; else, enter Step 210;

Step 240: perform an aggregation operation to the new flow entry nFE, the plurality of flow entries FE1-FEm and the at least one redundant flow entry RFE so as to generate a set of aggregated flow entries AFE; and Step 250: update the flow table Tf using the set of aggregated flow entries AFE.

Taking FIG. 4 as an example, the table 310 may be regarded as including the new flow entry nFE and the flow entries FE1-FEm. In this example, the number of flow entry is three. After checking the table 310, five redundant flow entries should be inserted so as to have eight flow entries in the table 320. In the example shown in FIG. 4, the numbers of the flow entries before and after inserting the redundant flow entries may be used to calculate a ratio 3/8, that is 37.5%. If the threshold is set as 40%, the ratio (37.5%) may not reach the threshold, so the aggregation operation may not be triggered and performed. If the threshold is set as 35%, the aggregation operation may be triggered and performed. The threshold may be set according to the statistical data and/or experience of a researcher. If the threshold is set overly high, it may be difficult to trigger the aggregation operation, and the effect of reducing the number of flow entries may be less effective. In some cases, it may fail to trigger any aggregation operation before the flow entries in the flow table Tf are expired. If the threshold is set overly low, an aggregation operation may be triggered too frequently so that the loading of the controller 110 may be too heavy. Hence, the threshold should be set to be a reasonable value to trigger the aggregation operation appropriately.

According to embodiments, the foresaid threshold may be adjusted dynamically according to the result of the aggregation operation. The following equation eq-1 may be used to calculate the threshold.

$$Th_{n+1}=f(Th_n, C_n, C_{n-1}) \qquad \text{(eq-1)}$$

The denotation f( ) may be a function. The threshold $Th_n$ may be the present threshold used to determine whether to trigger an aggregation operation or not. The threshold $Th_{n+1}$ may be a following threshold used to determine whether to trigger an aggregation operation in a following determination. The compression ratio $C_n$ may be a ratio of the number of the set of aggregated flow entries AFE and the number of the plurality of flow entries FE1-FEm. The previous compression ratio $C_{n-1}$ may be a ratio of the number of the flow entries FE1-FEm after performing a previous aggregation operation and the number of a set of pre-aggregated flow entries before performing the previous aggregation operation. For example, if the number of flow entries is reduced from K1 to K2 after an $(n-1)_{th}$ aggregation operation, the compression ratio $C_{n-1}$ may be calculated as K2/K1. In an $n_{th}$ aggregation operation, the threshold used to determine whether to trigger an aggregation operation may be the threshold $Th_n$, and the number of flow entries is reduced from K2 to K3 if the aggregation operation is triggered so that the compression ratio $C_n$ may be K3/K2. Before an $(n+1)_{th}$ aggregation operation, the threshold used to determine whether to trigger an aggregation operation may be the threshold $Th_{n+1}$. According to an embodiment, the equation eq-1 may be (but not limited to) the following equation eq-2.

$$Th_{n+1}=f(Th_n, C_n, C_{n-1})=Th_n+\alpha(C_n-C_{n-1}) \qquad \text{(eq-2)}$$

The constant $\alpha$ may be adjusted according to demand. For example, the constant $\alpha$ may be 1.5 or 2. If the foresaid equation eq-2 is used, the threshold may be raised by the times of performing the aggregation operations. Hence, the frequency of triggering an aggregation operation may decrease when the flow entries (also known as flow rules) in the flow table Tf are getting converged by means of a series of aggregation operations. The equation eq-2 may be merely an exemplary equation, and other appropriate equations for adjusting the threshold dynamically may also be in the scope of the present invention.

Figure 7:
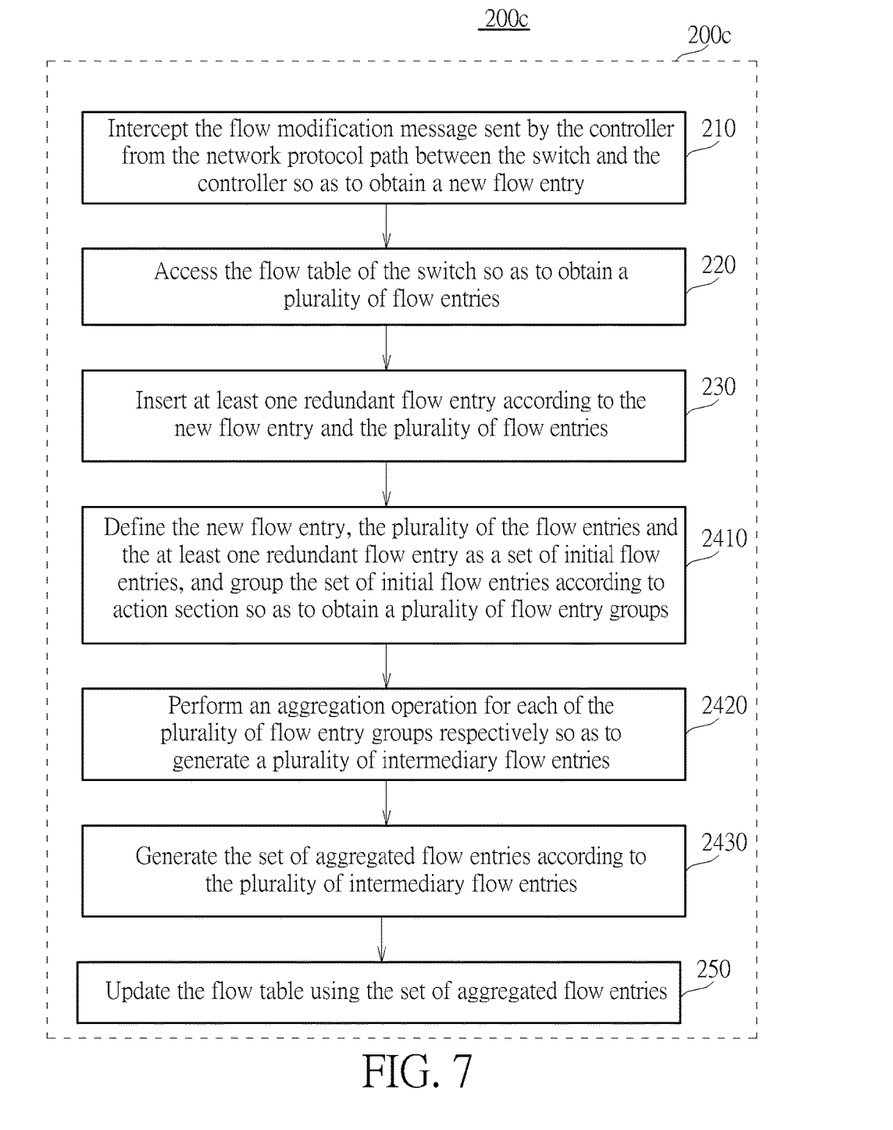
FIG. 7 illustrates a network system control method according to an embodiment of the present invention.
Figure 8:
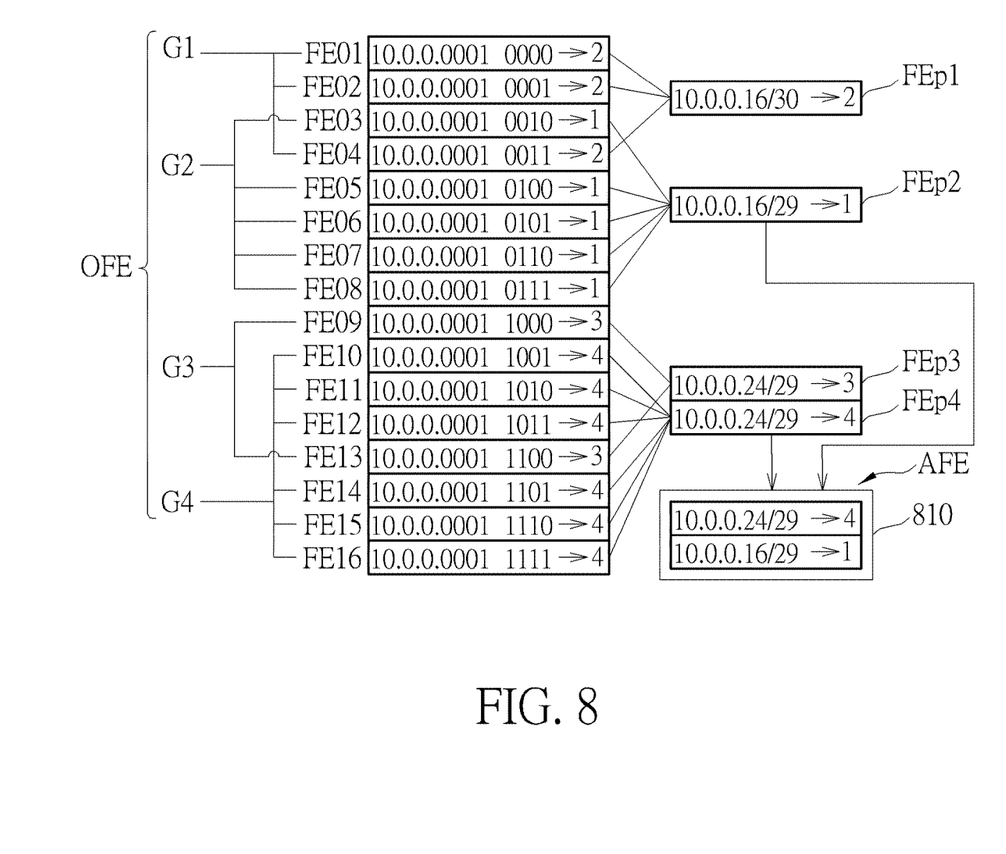
FIG. 8 illustrates a set of aggregated flow entries are generated using a set of initial flow entries according to an embodiment of the present invention.

FIG. 7 illustrates a network system control method 200c according to an embodiment. The method 200c may be based on the method 200, and Step 240 may include Steps 2410-2430 below. FIG. 8 illustrates a set of aggregated flow entries AFE is generated using a set of initial flow entries OFE according to an embodiment of the present invention. As the example of FIG. 8, the method 200c of FIG. 7 may include the following steps.

Step 210: intercept the flow modification message fm sent by the controller 110 from the network protocol path Pt between the switch 120 and the controller 110 so as to obtain a new flow entry nFE;

Step 220: access the flow table Tf of the switch 120 so as to obtain a plurality of flow entries FE1-FEm;

Step 230: insert at least one redundant flow entry RFE according to the new flow entry nFE and the plurality of flow entries FE1-FEm;

Step 2410: define the new flow entry nFE, the plurality of the flow entries FE1-FEm and the at least one redundant flow entry RFE as a set of initial flow entries OFE, and group the set of initial flow entries OFE according to action section so as to obtain a plurality of flow entry groups G1-Gj;

Step 2420: perform an aggregation operation for each of the plurality of flow entry groups G1-Gj respectively so as to generate a plurality of intermediary flow entries FEp1-FEpj;

Step 2430: generate the set of aggregated flow entries AFE according to the plurality of intermediary flow entries FEp1-FEpj; and Step 250: update the flow table Tf using the set of aggregated flow entries AFE.

In FIG. 8, the variable j in FIG. 7 may be 4 as an example. The example in FIG. 8 is merely provided to explain the embodiment instead of limiting the scope of the embodiment. The flow entries FE01-FE16 may be obtained by integrating the new flow entry and the flow entries in the flow table. In this example, the flow entries FE01-FE16 may be defined as the set of initial flow entries OFE. That is to say, the flow entries FE01-FE16 may not be used to perform an aggregation operation yet, but allowed to be used to perform the aggregation operation. In FIG. 8, the flow entries FE01-FE16 are illustrated without showing in a complete format. Merely the sections related to the aggregation operation such as the destination IP addresses and the action sections are shown. As shown in FIG. 8, the action sections of the flow entries FE01, FE02 and FE04 are "→2", the action sections of the flow entries FE03 and FE05-FE08 are "→1", the action sections of the flow entries FE09 and FE13 are "→3", and the action sections of the flow entries FE10-FE12 and FE14-FE16 are "→4". The flow entries FE01-16 may be therefore grouped to obtain four groups G1-G4 according to the action sections. Take the flow entry group G1 as an example. The group G1 includes three flow entries FE01, FE02 and FE04, the first three numbers (10, 0, 0) of the three flow entries are identical, and all digits of the fourth number (expressed as an 8-digit binary number) of the three flow entries are identical except the last two digits. Hence, an aggregation operation may be performed using the group G1 to generate the intermediary flow entry FEp1 including "10.0.0.0001000**→2". The intermediary flow entry FEp1 may be expressed as "10.0.0.16/30→2" when being expressed in the foresaid CIDR format. Similarly, the groups G2, G3 and G4 may be used to perform aggregation operations respectively to obtain the intermediary flow entries FEp2 (i.e. 10.0.0.16/29→1 in this example), FEp3 (i.e. 10.0.0.24/29→3 in this example) and FEp4 (i.e. 10.0.0.24/29→4 in this example) correspondingly.

In Step 2430, the set of aggregated flow entries AFE may be generated according to the intermediary flow entries FEp1-FEpj as described below. According to an embodiment, it may be checked whether destination addresses of any two of the plurality of intermediary flow entries FEp1-FEpj are identical. When two of the plurality of intermediary flow entries FEp1-FEpj have an identical destination address, one of the two intermediary flow entries may be selected into the set of aggregated flow entries AFE. The selected intermediary flow entry may relate to more flow entries of the set of initial flow entries OFE than the unselected intermediary flow entry. For example, in FIG. 8, the two intermediary flow entries FEp1 and FEp2 include a destination IP address 10.0.0.16, the intermediary flow entry FEp1 relates to three flow entries FE01-FE02 and FE04 of the set of initial flow entries OFE, and the intermediary flow entry FEp2 relates to five flow entries FE03 and FE05-FE08 of the set of initial flow entries OFE. The intermediary flow entry FEp2 may relate to more flow entries of the set of initial flow entries OFE, so the intermediary flow entry FEp2 may be selected into the set of aggregated flow entries AFE. Similarly, the intermediary flow entries FEp3 and FEp4 may have an identical destination IP address, and the intermediary flow entry FEp4 may be selected into the set of aggregated flow entries AFE. As shown in FIG. 8, a stack 810 may be set in the switch 120, and the selected flow entries (e.g. the selected intermediary flow entries FEp2 and FEp4) may be stored in the stack 810. According to an embodiment, being placed into the stack 810 may be regarded as being selected into the set of aggregated flow entries AFE.

According to an embodiment, Step 2430 may also include selecting an intermediary flow entry relating to a set of initial flow entries having fewer consecutive destination IP addresses into the set of aggregated flow entries AFE. For example, if a first intermediary flow entry relates to a set of initial flow entries having destination IP addresses "10.0.0.00010000" and "10.0.0.00010001", and a second intermediary flow entry relates to another set of initial flow entries having destination IP addresses "10.0.0.00010000" and "10.0.0.00010010", the second intermediary flow entry may be selected into the set of aggregated flow entries AFE (by being placed in the stack 810, for example) since the second intermediary flow entry corresponds to a set of initial flow entries having fewer consecutive destination IP addresses. When an intermediary flow entry relates to a set of initial flow entries having fewer consecutive destination IP addresses, the set of initial flow entries are of a wider distribution, and the probability of performing an aggregation operation with other flow entries may be higher in the following degrading operation. The degrading operation is described below.

According to an embodiment, Step 2430 may further include selecting one of the intermediary flow entries FEp1-FEpj into the set of aggregated flow entries AFE where the selected intermediary flow entry may have a destination IP address with a larger number after the slash when expressing the destination IP address in CIDR format. When the number after the slash is larger, it means that fewer digits are masked using the wild card sign, and it may be more difficult to perform a degrading operation with the flow entries. The flow entries may be more difficult to be aggregated or simplified, so the flow entries may be placed into the stack with higher priority for being selected into the set of aggregated flow entries AFE. The foresaid operations of Step 2430 may be used without a confliction. For example, priority of the operations mentioned above may be shown as (but not limited to) Table 1.

TABLE 1

| Priority | |
|---|---|
| Priority | The operation of generating the set of aggregated flow entries AFE according to the plurality of intermediary flow entries FEp1-FEpj |
| High | An intermediary flow entry relating to more flow entries of the set of initial flow entries OFE is selected into the set of aggregated flow entries AFE. |
| Medium | An intermediary flow entry relating to a set of initial flow entries having fewer consecutive destination IP addresses is selected into the set of aggregated flow entries AFE. |
| Low | An intermediary flow entry having a destination IP address with a larger number after the slash when expressing the destination IP address in CIDR format is selected into the set of aggregated flow entries AFE |

According to embodiment, Step 2430 may also include performing a degrading operation using the intermediary flow entries FEp1-FEpj so as to obtain a set of degraded flow entries and selecting the degraded flow entries into the set of aggregated flow entries AFE. The said degrading operation may be performed by increasing the number after the slash when a destination IP address is expressed in CIDR format reasonably. That is to say, the number of digits being masked using a wild card sign (e.g. asterisk) may be decreased. According to an embodiment, when a plurality of flow entries are replaced with an aggregated flow entry, the aggregated flow entry may be used as a flow rule. The said degrading operation may be performed repeatedly till the flow entries are unable to be aggregated and degraded, and then the flow entries may be placed into a stack (e.g. the stack 810) to be selected into the set of aggregated flow entries AFE.

Figure 9:
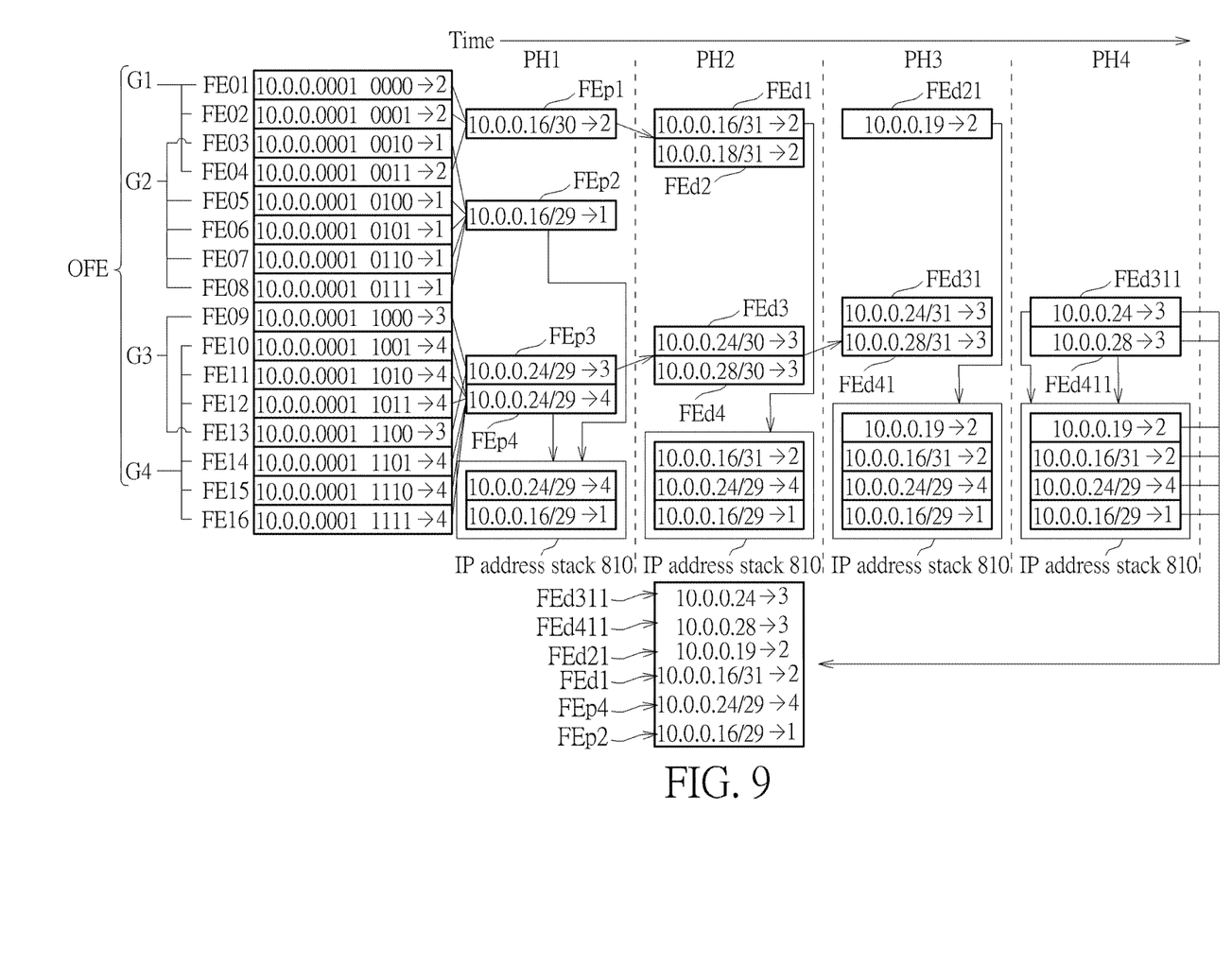
FIG. 9 illustrates the generation of the set of aggregated flow entries using the set of initial flow entries according to an embodiment of the present invention.

FIG. 9 illustrates the generation of the set of aggregated flow entries AFE using the set of initial flow entries OFE according to an embodiment of the present invention. In FIG. 9, four phases PH1-PH4 are shown according to a time axis. The flow entries FE01-FE16 of the set of initial flow entries OFE may be identical to the example shown in FIG. 8. Hence, in FIG. 9, it is not described repeatedly about generating the intermediary flow entries FEp1-FEp4 and selecting the intermediary flow entries FEp2 and FEp4 into the stack 810 and the set of aggregated flow entries AFE. In the second phase PH2 of FIG. 9, the unselected intermediary flow entry FEp1 may be degraded according to the degrading operation mentioned above. That is to say, the number after the slash of the destination IP address "10.0.0.16/30→2" (i.e. 10.0.0.000100**→2) may be increased to obtain "10.0.0.16/31→2 (i.e. 10.0.0.0001000*→2) and "10.0.0.18/31→2" (i.e. 10.0.0.0001001*→2) which correspond to the degraded flow entries FEd1 and FEd2 respectively. Similarly, the intermediary flow entry FEp3 (having a destination IP address "10.0.0.24/29→3" and being not selected into the set of aggregated flow entries AFE) may be degraded to obtain the degraded flow entries FEd3 and FEd4 having destination IP addresses "10.0.0.24/30→3" and "10.0.0.28/30→3" respectively. Similar to the description above, the degraded flow entry FEd1 may relate to the flow entries FE01-FE02 of the set of initial flow entries OFE, but the degraded flow entry FEd2 may merely relate to the flow entry FE04, so the degraded flow entry FEd1 may be selected and placed in the stack 810. Similarly, in the phase PH3, the degraded flow entries FEd2, FEd3 and FEd4 may be further degraded to obtain the degraded flow entries FEd21, FEd31 and FEd41. Because the degraded flow entry FEd21 may have an identical destination IP address as the flow entry FE04, and the destination IP address may be unable to be degraded since the number after the slash is 0 with CIDR format, the degraded flow entry FEd21 may be placed into stack 810 to be selected into the set of aggregated flow entries AFE. Similarly, in the phases PH3-PH4, the degraded flow entries FEd3 and FEd4 may be degraded step by step to obtain the degraded flow entries FEd311 and FEd411. The degraded flow entry FEd311 may correspond to the flow entry FE09, and the degraded flow entry FEd411 may correspond to the flow entry FE13. In phase PH4, the degraded flow entries FEd311 and FEd411 may be placed in the stack 810. As shown in FIG. 9, in the phase PH4, the stack 810 may collect the flow entries FEp2, FEp4, FEd1, FEd21, FEd411 and FEd311 from its bottom toward its top. These collected flow entries may be used to update the flow entries in the flow table Tf in FIG. 1. Since the stack may be used on the last-in-first-out (LILO) principle, in the stack 810, a flow entry closer to the top of the stack may be taken to check whether a flow entry sent from the controller 110 is matched. According to an embodiment, when placing a flow entry into the stack 810, it may be checked whether the placed flow entry is identical to any existing flow entry in the stack 810, and the flow entry may not be placed in the stack if it is identical to an existing flow entry in the stack. As shown in FIG. 9, the sixteen flow entries FE01-FE16 of the set of initial flow entries OFE may be reduced to six flow entries by performing aggregation and degrading operations. Hence, the number of flow entries may be reduced according to embodiments of the present invention.

In summary, by means of the network control method (IDFA method) and the network control system provided by embodiments of present invention, the number of flow entries (also known as flow rule) in a flow table may be effectively reduced so as to improve the overflow problem of the flow table. Moreover, the operating efficiency is improved using the IDFA method. For example, according to tested cases, the compression ratio of converging the flow entries may reach 1.29%, and the operating time may be shortened by comparing with using previous methods. For example, the operating time of the IDFA method may be 20% of the operating time of the Flow Table Reduction Scheme (FTRs) method approximately. Furthermore, using the IDFA method provided by the present invention may assure the semantical equivalency when processing the flow entries, and have an advantage of IP routing. It is allowed to perform an aggregation operation of the flow entries on an edge switch, so it is beneficial for improving the compression ratio of flow entries and reducing the loading of hardware. Hence, the network system control method and system provided by the present invention may be beneficial in the field.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A network system control method, comprising:
   intercepting a flow modification message sent by a controller from a network protocol path between a switch and the controller so as to obtain a new flow entry;
   accessing a flow table of the switch so as to obtain a plurality of flow entries;
   inserting at least one redundant flow entry according to a destination address of the new flow entry and a plurality of destination addresses of the plurality of flow entries;
   performing an aggregation operation to the new flow entry, the plurality of flow entries and the at least one redundant flow entry so as to generate a set of aggregated flow entries; and
   updating the flow table using the set of aggregated flow entries;
   wherein:
   inserting the at least one redundant flow entry according to the destination address of the new flow entry and the plurality of destination addresses the plurality of flow entries comprises:
   expanding the destination address of the new flow entry and the plurality of destination addresses of the plurality of flow entries;

arranging the destination address of the new flow entry and the plurality of destination addresses of the plurality of flow entries in sequence;

checking an arrangement of the destination address of the new flow entry and the plurality of destination addresses of the plurality of flow entries so as to find out at least one discontinuity; and filling the at least one redundant flow entry into the at least one discontinuity so that the destination address of the new flow entry, the plurality of destination addresses of the plurality of flow entries and at least one destination address of the at least one redundant flow entry are continuous; and performing the aggregation operation to the new flow entry, the plurality of flow entries and the at least one redundant flow entry so as to generate the set of aggregated flow entries comprises:

maintaining a corresponding portion of the destination address of the new flow entry, the plurality of destination addresses of the plurality of flow entries and the at least one destination address of the at least one redundant flow entry; and using a set of wildcard signs to replace a non-corresponding portion of the of the destination address of the new flow entry, the plurality of destination addresses of the plurality of flow entries and the at least one destination address of the at least one redundant flow entry so as to generate the set of aggregated flow entries.

2. The method of claim 1, further comprising:
the switch sending a packet input message to the controller so as to confirm correctness of action section of the at least one redundant flow entry.

3. The method of claim 1, further comprising:
checking whether a ratio of number of the new flow entry and the plurality of the flow entries and a sum of number of the new flow entry and the plurality of the flow entries and number of the at least one redundant flow entry has reached a threshold;
wherein the aggregation operation is performed when the ratio reaches the threshold.

4. The method of claim 3, further comprising:
generating a following threshold according to a compression ratio, a previous compression ratio and the threshold;
wherein the compression ratio is a ratio of number of the set of aggregated flow entries and number of the plurality of flow entries, and the previous compression ratio is a ratio of number of the plurality of flow entries after performing a previous aggregation operation and number of a set of pre-aggregated flow entries before performing the previous aggregation operation.

5. The method of claim 1, wherein performing the aggregation operation to the new flow entry, the plurality of flow entries and the at least one redundant flow entry so as to generate the set of aggregated flow entries further comprises:

defining the new flow entry, the plurality of the flow entries and the at least one redundant flow entry as a set of initial flow entries;

grouping the set of initial flow entries according to action section so as to obtain a plurality of flow entry groups;

performing an aggregation operation for each of the plurality of flow entry groups respectively so as to generate a plurality of intermediary flow entries; and generating the set of aggregated flow entries according to the plurality of intermediary flow entries.

6. The method of claim 5, wherein generating the set of aggregated flow entries according to the plurality of intermediary flow entries comprises:

checking whether destination addresses of any two of the plurality of intermediary flow entries are identical;

when two of the plurality of intermediary flow entries have an identical destination address, selecting one of the two of the plurality of intermediary flow entries into the set of aggregated flow entries, wherein the selected intermediary flow entry relates to more flow entries of the set of initial flow entries than the unselected intermediary flow entry.

7. The method of claim 5, wherein generating the set of aggregated flow entries according to the plurality of intermediary flow entries comprises:

selecting one of the plurality of intermediary flow entries into the set of aggregated flow entries, wherein the selected one has a larger number after a slash when representing destination address using classless inter-domain routing (CIDR) format;

wherein the larger number after the slash corresponding to the selected one is larger than another number after another slash corresponding to another one of the plurality of intermediary flow entries.

8. A network system comprising:
a controller configured to send a flow modification message and a packet;
a switch comprising a security channel module and a routing unit, the security channel module being linked to the controller via a network protocol path and configured to receive the flow modification message, the routing unit comprising a flow table, the flow table having a plurality of flow entries, the plurality of flow entries being configured to be compared with the packet so as to confirm a destination address and a corresponding operation of the packet, the switch being configured to obtain a new flow entry according to the flow modification message, insert at least one redundant flow entry according to a destination address of the new flow entry and a plurality of destination addresses of the plurality of flow entries, perform an aggregation operation to the new flow entry, the plurality of flow entries and the at least one redundant flow entry so as to generate a set of aggregated flow entries, and update the flow table using the set of aggregated flow entries;

wherein:
the switch is configured to insert the at least one redundant flow entry according to the destination address of the new flow entry and the plurality of destination addresses the plurality of flow entries by:

expanding the destination address of the new flow entry and the plurality of destination addresses of the plurality of flow entries;

arranging the destination address of the new flow entry and the plurality of destination addresses of the plurality of flow entries in sequence;

checking an arrangement of the destination address of the new flow entry and the plurality of destination addresses of the plurality of flow entries so as to find out at least one discontinuity; and filling the at least one redundant flow entry into the at least one discontinuity so that the destination address of the new flow entry, the plurality of destination addresses of the plurality of flow entries and at least one destination address of the at least one redundant flow entry are continuous; and the switch is configured to perform the aggregation operation to the new flow entry, the plurality of flow entries and the at least one redundant flow entry so as to generate the set of aggregated flow entries by:
maintaining a corresponding portion of the destination address of the new flow entry, the plurality of destination addresses of the plurality of flow entries and the at least one destination address of the at least one redundant flow entry; and
using a set of wildcard signs to replace a non-corresponding portion of the destination address of the new flow entry, the plurality of destination addresses of the plurality of flow entries and the at least one destination address of the at least one redundant flow entry so as to generate the set of aggregated flow entries.

* * * * *